United States Patent [19]

McCollum et al.

[11] Patent Number: 4,810,535

[45] Date of Patent: Mar. 7, 1989

[54] GLYCIDOL-MODIFIED POLYEPOXIDE-POLYOXYALKYLENEPOLYAMINE ADDUCTS

[75] Inventors: Gregory J. McCollum, Gibsonia; Robert R. Zwack, Allison Park, both of Pa.

[73] Assignee: PPG Industries, Inc., Pittsburgh, Pa.

[21] Appl. No.: 151,150

[22] Filed: Feb. 1, 1988

[51] Int. Cl.[4] .................. C08G 59/14; C09D 5/44; C25D 13/00

[52] U.S. Cl. .................................. 427/410; 427/302; 204/181.7; 523/414; 523/415; 523/416; 528/103; 528/111; 528/407

[58] Field of Search ..................... 528/103, 111, 407; 523/414, 415, 416; 427/302, 410; 204/181.7

[56] References Cited

U.S. PATENT DOCUMENTS 4,086,151 4/1978 Stevens et al. ............... 528/103 X
4,116,900 9/1978 Belanger ....................... 528/103 X Primary Examiner—Earl Nielsen
Attorney, Agent, or Firm—Godfried R. Akorli

[57] ABSTRACT

Disclosed herein are glycidol-modified polyepoxide-polyoxyalkylene polyamine adducts for use as additives in coatings to provide improved coating appearance.

18 Claims, No Drawings

GLYCIDOL-MODIFIED POLYEPOXIDE-POLYOXYALKYLENEPOLYAMINE ADDUCTS

BACKGROUND OF THE INVENTION

Field of the Invention: The present invention relates to modified adducts of polyepoxide and polyoxyalkylenepolyamines to produce reaction products for use in cationic electrodeposition.

A serious problem associated with electrodeposition, as practiced industrially, is appearance defects in films. Such film defects include craters resulting from contamination due to dirt, oil and the like.

U.S. Pat. No. 4,423,166 describes an additive which can be added to a cationic electrodeposition bath to improve the appearance of the electrodeposited coatings. The additive comprises an ungelled reaction product of a polyepoxide and a polyoxyalkylenepolyamine. Although effective in improving appearance, this additive can cause problems of adhesion to subsequently applied materials especially alkyd topcoats to the electrocoats.

The present invention is an improvement in said additive whereby crater resistance of the coating is improved without causing the aforedescribed adhesion problems.

SUMMARY OF THE INVENTION

In accordance with the foregoing, the present invention encompasses a resinous composition comprising a glycidol-modified ungelled resin comprising a polyepoxide-polyoxyalkylenepolyamine adduct. The resinous composition can be prepared by reacting a polyepoxide with a polyoxyalkylenepolyamine, followed by reacting the resulting amine-functional reaction product with glycidol.

The above resinous composition is particularly useful as an additive in cationic electrodepositable compositions in order to provide intercoat adhesion, such as alkyd topcoat adhesion, to electrocoated primers while maintaining or improving appearance.

DETAILED DESCRIPTION OF THE INVENTION

The ungelled resin, useful herein, can be prepared by reacting a polyepoxide with a polyoxyalkylenepolyamine. This reaction product is alternately referred to herein as an "adduct". The equivalent ratio of an amine to epoxy is preferably controlled within the range of 1.05 to 2:1 so as to provide an amine-functional reaction product with the required molecular weight and chain length, more fully described hereinbelow.

By "non-gelled" is meant the adduct is substantially free of crosslinking and has an intrinsic viscosity when dissolved in a suitable solvent. The intrinsic viscosity of the adduct is an indication of its molecular weight. In contrast, a gelled resin, since it is of essentially infinitely high molecular weight, will have an intrinsic viscosity too high to measure.

The polyepoxides useful in the preparation of the ungelled resinous compositions of the present invention have an average 1,2-epoxy functionality greater than one, preferably at least about 1.4, and most preferably about 2. Polyepoxides having an average epoxy functionality much higher than 2.0 can be used but are not preferred because of gelation problems on reaction with the polyoxyalkylenepolyamine. Examples of higher functionality polyepoxides are epoxidized novalac resins. Also, minor amounts of monoepoxide can be used in combination with the polyepoxides.

The polyepoxides which are preferred are polyglycidyl ethers of cyclic polyols having a molecular weight of about 340 to 5,000, preferably 340 to 2,000, and an epoxy equivalent of about 170 to 2,500, preferably 170 to 1,000. These may be produced, for example, by etherification of a polyphenol with epichlorohydrin or dichlorohydrin in the presence of an alkali. The phenolic compound may be bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxytertiarybutylphenyl)-2,2-propane, bis(2-hydroxynaphthyl)methane 1,5-hydroxynaphthalene and the like.

Examples of other polyepoxides, although they are not preferred, are polyglycidyl ethers of polyhydric alcohols such as ethylene glycol, diethylene glycol, triethylene glycol, 1,2-propylene glycol, 1,3-propylene glycol, 1,4-butylene glycol, 1,5-pentanediol, polyethylene glycol, polypropylene glycol and the like.

The preferred polyoxyalkylenepolyamines useful in the practice of the invention are diamines having the following structural formula:

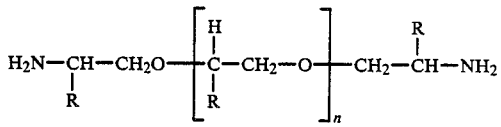

wherein R can be the same or different and is selected from the group consisting of hydrogen, lower alkyl radicals having from about 1 to 6 carbon atoms, with R being a methyl group being preferred; and n represents an integer of from about 1 to 50, preferably 1 to 35. A number of such polyoxyalkylenepolyamines are described in more detail in U.S. Pat. No. 3,236,895, column 2, lines 40–72; methods of preparation of the polyoxyalkylenepolyamines are illustrated in the patent in Examples 4–6 and 8–12 in columns 4 to 9 thereof; the aforementioned portions of U.S. Pat. No. 3,263,895 are hereby being incorporated by reference. Mixed polyoxyalkylenepolyamines can be used, that is, those in which the oxyalkylene group can be selected from more than one moiety. Examples would be mixed polyoxyethylene-propylenepolyamines such as those having the following structural formula:

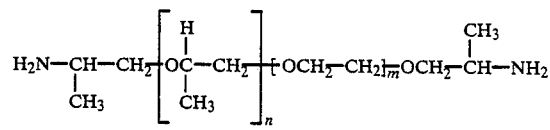

wherein n+m is equal to 1 to 50, preferably 1 to 35, m is equal to 1 to 49, preferably 1 to 34, and n is equal to 1 to 34.

Besides the polyoxyalkylenepolyamines mentioned above, derivatives of polyoxyalkylenepolyamines may also be useable. Examples of suitable derivatives would be aminoalkylene derivatives which are prepared by reacting polyoxyalkylenepolyamines, such as those mentioned above, with acryonitrile followed by hydrogenation of the reaction product. An example of a suitable derivative would be that of the following structural formula:

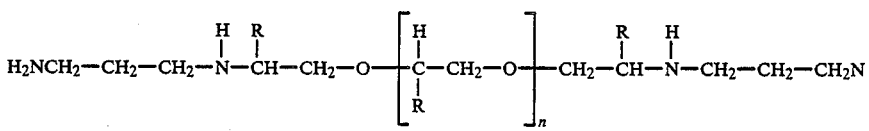

wherein R and n have the meanings mentioned above.

Therefore, the expression "polyoxyalkylenepolyamines" is used herein to denote polyamines containing both oxyalkylene groups and at least two amine groups, preferably primary amine groups, per molecule. The polyamines preferably have a molecular weight (number average) of about 137 to 3,600, preferably about 400 to 3,000, and most preferably 800 to 2,500. The polyamines preferably have amine equivalent weight of about 69 to 1,800, preferably 200 to 1,500, and most preferably 400 to 1,250. In determining the equivalent weight, the primary amines are considered to be monofunctional. Polyamines with molecular weights much higher than 3,600 are not preferred because of poor solubility characteristics; those with molecular weights less than 137 are not preferred because of gelation problems.

Polyoxyalkylenepolyamines with higher amine-functionality, i.e., triamines, are not preferred in the practice of the invention because of gelation problems. If they are used, they should be used with monofunctional amines so as to reduce the average functionality.

The equivalent ratio of active hydrogens in polyoxyalkylenepolyamine to epoxy in the polyepoxide is preferably within the range of about 1.05 to 2:1 because of low molecular weight products and the possibility of excessive amounts of free amine. The equivalent ratio is based on the equivalent of 1,2-epoxy groups and the equivalent of active hydrogens which are capable of reacting with 1,2-epoxy groups, e.g., amino, hydroxyl, and thiol, with the primary amine being considered monofunctional. It may be possible to go outside the ranges and get acceptable products. For example, the equivalent ratio of amine to epoxy approaching 1:7 may be used if some monofunctional amine is present so as to reduce functionality and avoid gelation.

In preparing the reaction products of this invention, the polyepoxide is usually added to the polyoxyalkylenepolyamine. Usually, the temperature of the reaction will be about 50° to 180° C., preferably from about 90° to 150° C.

The reaction can be conducted neat or in the presence of a solvent. The solvent is one which is non-reactive with epoxide groups and amine groups under the reaction conditions employed. Suitable solvents include hydrocarbons, ethers, alcohols, and ether-alcohols. The amount of solvent used will vary between from 0 to 90, preferably about 5 to 50 percent based on total weight of the reaction mixture.

The polyepoxide-polyoxyalkylenepolyamine reaction product is characterized as being substantially free of epoxy-functionality (that is, epoxy equivalent greater than 10,000) and being amine-functional preferably with primary and secondary amine-functionality.

In accordance with the invention, the polyepoxide-polyoxyalkylenepolyamine adduct is reacted with glycidol. The glycidol reacts with some or all of the amine in the polyepoxide-polyoxyalkylenepolyamine reaction product. In this reaction, the equivalent ratio of reactants is from about 0.2 to 3 and preferably 0.75 to 1.5 of gyycidol per equivalent of amine groups in the polyepoxide-polyoxyalkylenepolyamine adduct. Excess glycidols over and above the amount needed to react with NH groups can be incorporated into the polymer via reaction with hydroxyl group, usually in the presence of base catalysts.

The modified adduct is dispersible in the aqueous medium upon at least partial neutralization with acid. Suitable acids include dimethylolpropioic acid; organic acids, such as formic acid, lactic acid and acetic acid; and an inorganic acid such as phosphoric acid. The extent of neutralization depends upon the particular modified adducts; usually, only sufficient acid is added to solubilize or disperse the modified adduct. Usually, the adduct is neutralized to an extent of at least 30 percent of the total theoretical neutralization.

The modified adduct, when at least partially neutralized with acid, is characterized as being non-gelled and soluble or dispersible in the aqueous medium. The neutralized modified adduct is alternately referred to herein as a "modified cationic adduct". The term "dispersion" as used within the context of the present invention is believed to be a two-phase transparent, translucent or opaque aqueous resinous system in which the resin is the dispersed phase and water is the continuous phase. Average particle size diameter of the resinous phase is generally less than 10 and preferably less than 5 microns. The concentration of the resinous phase in the aqueous medium depends upon the particular end use of the dispersion and is generally not critical. Usually, the modified cationic adduct will be dispersed in the aqueous medium and the dispersion will contain from at least about 0.5 and usually from about 0.5 to 50 percent by weight of the modified cationic adduct based on total weight of the dispersion.

Although, it is most useful when formulated with conventional cationic electrodepositable resins to form cationic electrodepositable coating compositions, the modified cationic adducts can be dispersed in the aqueous medium without the conventional cationic electrodepositable resins being present.

When used in cationic electrodeposition, the modified cationic adducts are combined with cationic electrodepositable resins which are different therefrom. They are particularly useful in combination with high throwpower cationic electrodepositable resins which are used in the electrocoating of articles with complex shapes such as automobiles.

Examples of cationic electrodepositable resins include amine salt group-containing resins which are the acid-solubilized reaction products of polyepoxides and primary or secondary amines such as described in U.S. Pat. No. 4,031,050 to Jerabek. Usually, the amine salt group-containing resins are used in combination with a blocked isocyanate curing agent. The isocyanate can be fully blocked as described in the aforementioned U.S. Pat. No. 4,031,050, or the isocyanate can be partially blocked and reacted with a resinous system as described in U.S. Pat. No. 3,947,358 to Jerabek et al. Also, such one-component compositions are described in U.S. Pat. No. 4,134,866 and DE-OS No. 2,752,255. Besides high throwpower cationic electrodepositable resins, the modified cationic adducts of the invention can also be used with low throwpower resins such as cationic acrylic resins. Examples of these resins are described in U.S. Pat. Nos. 3,445,806 and 3,928,157.

Besides amine salt group-containing resins, quaternary ammonium salt group-containing resins can also be employed. Examples of these resins are those which are formed from reacting an organic polyepoxide with a tertiary amine acid salt. Such resins are described in U.S. Pat. Nos. 3,962,165, 3,975,346, and 4,001,156 to Bosso and Wismer. Examples of other cationic resins are ternary sulfonium salt group-containing resins such as those described in U.S. Pat. No. 3,793,278 to DeBona. Also, cationic electrodepositable resins which cure via a transesterification mechanism such as described in European patent application No. 12463 can also be employed.

The modified cationic adducts of the invention and cationic electrodepositable resins can be combined by simply blending the two together with mild agitation. Preferably, both the modified cationic adduct and the electrodepositable resin are in the form of aqueous dispersions having a solids content of about 0.5 to 50 percent. Prior, during, or after blending, the mixture can be combined with optional ingredients such as pigment, cosolvents, plasticizers, and other ingredients, such as fungicides, curing agents and catalysts, and thinned with deionized water to form the correct resin solids content for cationic electrodeposition.

The modified cationic adducts provide for better appearance of cured coatings, particularly with regard to craters.

The amount of modified cationic adducts in a coating composition is preferably within the range of about 0.5 to 40, more preferably from about 1 to 20 percent by weight, based upon the total weight of cationic resin solids. In combination with high throwpower cationic electrodepositable resins, which are present in amounts of about 60 to 99.5, preferably 80 to 99 percent by weight based on the total weight of cationic resin, as the amount of modified cationic adduct increases, throwpower and salt spray corrosion properties usually decrease; as the amount of modified cationic adduct decreases, appearance, flexibility and water resistance decrease.

The blend of the modified cationic adduct and cationic electrodepositable resin is in the form of an aqueous dispersion. The term "dispersion" is believed to be, as described above, a two-phase transparent, translucent or opaque resinous system in which the resin is the dispersed phase and water is the continuous phase. The average particle size diameter of the resinous phase is generally less than 10 and preferably less than 5 microns. The concentration of the resinous phase in the aqueous medium is usually at least 0.5 and usually from about 0.5 to 50 percent by weight based on the total weight of the aqueous dispersion.

Besides water, the aqueous medium may contain a coalescing solvent. Useful coalescing solvents include hydrocarbons, alcohols, esters, ethers, and ketones. The preferred coalescing solvents include alcohols, polyols, and ketones. Specific coalescing solvents include isopropanol, butanol, 2-ethylhexanol, isophorone, 4-methoxy-pentanone, ethylene and propylene glycol, and the monoethyl, monobutyl and monohexyl ethers of ethylene glycol. The amount of coalescing solvent is not unduly critical and is generally between about 0.01 and 40 percent, preferably about 0.05 to 25 percent by weight based on total weight of the aqueous medium. In some instances, a pigment composition and, if desired, various additives, such as surfactants or wetting agents, are included in the dispersion. Pigment composition may be of the conventional types, comprising, for example, iron oxides, lead oxides, strontium chromate, carbon black, coal dust, titanium dioxide, talc barium sulfate, as well as color pigments such as cadmium yellow, cadmium red, chromium yellow and the like. The pigment content of the dispersion is usually expressed as the pigment-to-binder ratio. In the practice of the present invention, the pigment-to-binder ratio is usually within the range of about 0.02 to 1:1. The other coating additives mentioned above are usually in the dispersion in amounts of about 0.01 to 3 percent by weight based on the total weight of resin solids.

When the aqueous dispersions, as described above, are employed for use in electrodeposition, they are in contact with an electrically conductive anode and an electrically conductive cathode with the surface to be coated being the cathode. Following contact with the aqueous dispersion, an adherent film of the coating composition is deposited on the cathode. The conditions under which the electrodeposition is carried out are, in general, similar to those used in electrodeposition of other types of coatings. Applied voltage may be varied and can be, for example, as low as one volt to as high as several thousand volts, but typically between about 50 and 500 volts. Current density is usually between 0.5 amperes and 15 amperes per square foot and tends to decrease during electrodeposition indicating the formation of an insulating film.

The electrocoating compositions of the present invention can be applied to a variety of electroconductive substrates especially metal, such as steel, aluminum, copper, magnesium and the like, including metallized plastic and conductive carbon-coated materials. For other conventional non-electrophoretic coating applications, compositions can be applied to the nonmetallic substrates such as glass, wood, and plastic.

After the coating has been applied, it is cured usually by baking at elevated temperatures such as 90° to 260° C. for about 1 to 30 minutes. The cured coating can be topcoated with the likes of an alkyd composition.

Illustrating the invention are the following examples which, however, are not to be considered as limiting the invention to their details. All parts and percentages in the examples as well as throughout the specification are by weight unless otherwise indicated.

EXAMPLE 1A

A polyepoxide, useful herein, was prepared as follows:

| Ingredients | Parts by Weight (grams) |
| --- | --- |
| EPON 828[1] | 1911 |
| Bisphenol A | 589 |
| Toluene | 132 |
| Ethyltriphenylphosphonium Iodide | 2.5 |
| Toluene | 940 |

[1]Epoxy resin having an epoxy equivalent weight of 188 made from reacting epichlorohydrin and bisphenol A, commercially available from Shell Chemical Company.

The EPON 828, bisphenol A, and the 132 grams of toluene were charged to a properly equipped reaction vessel and heated under a nitrogen blanket to 110° C. and held thereat for about 30 minutes. The ethyltriphenylphosphonium iodide was added to the reaction mixture which was held for 15 minutes at 110° C. Thereafter, the reaction mixture was heated to 130° C. with a resulting exotherm to 160° C. The resultant mixture was held at 160° C. for one hour followed by addition of the 940 grams of toluene.

The resultant mixture comprising a polyepoxide resin had an epoxy equivalent weight of 525.5 on solids.

EXAMPLE 1B

A polyoxyalkylene-polyamine adduct of the above polyepoxide was prepared as follows:

| Ingredients | Parts by Weight (grams) | Equivalents |
| --- | --- | --- |
| Jeffamine 2000[1] | 4819 | 4.917 |
| The polyepoxide of Example 1A (70% solids) | 2741 | 3.652 |

[1] A polyoxyalkylene diamine having molecular weight of 2,000, available from Texaco Company.

The Jeffamine 2000 was charged into a properly equipped reaction vessel, heated under a nitrogen blanket to 95° C. followed by addition of the polyepoxide. The reaction mixture was heated to 120° C. and held thereat for three hours.

EXAMPLE 1C

An aqueous dispersion of the resultant mixture of Example 1B was prepared as follows: To 1300 grams of the adduct of Example 1B was added 17.3 grams of lactic acid (20% total neutralization) and deionized water was added in stages, with stirring to form an aqueous dispersion of the adduct. The dispersion was then solvent-stripped at vacuum pressure of 24 inches of mercury to 30 percent solids. Thereafter, 21.7 grams of lactic acid was added to raise the total neutralization of the dispersion to 45 percent. The resultant product is in effect a dispersion of a "stripped unmodified adduct".

EXAMPLE 1D

A glycidol-modified adduct of the invention was prepared as follows:

| Ingredients | Parts by Weight (grams) | Equivalents |
| --- | --- | --- |
| The Jeffamine-adduct of Example 1B | 1300 | 1.063 |
| Glycidol | 19.7 | 0.267 |

The Jeffamine-adduct was charged to a properly equipped reaction vessel and heated to 100° C., followed by the addition of glycidol. The resultant mixture was held thereat for about five hours with attainment of an epoxy equivalent weight of infinity.

The resulting glycidol-modified Jeffamine-adduct was neutralized and dispersed in water as follows. To 1100 grams of the glycidol-modified adduct was added 14.4 grams of lactic acid to effect 20 percent total neutralization. The neutralized adduct was dispersed in stages in water to produce an aqueous dispersion having 35 percent solids content. The dispersion was then solvent-stripped to 30 percent solids. An additional 18 grams of lactic acid and 178 grams of deionized water were added to raise the total neutralization of the dispersion to 45 percent.

EXAMPLE 1E

A glycidol-modified adduct of the invention was prepared as follows:

| Ingredients | Parts by Weight (grams) | Equivalents |
| --- | --- | --- |
| The Jeffamine-adduct of Example 1B | 1300 | 1.063 |
| Glycidol | 39.3 | 0.535 |

The Jeffamine-adduct was charged to a properly equipped reaction vessel and heated to 100° C. followed by the addition of glycidol. The resultant mixture was held thereat for about five hours with attainment of an epoxy equivalent weight of infinity.

The resulting glycidol-modified Jeffamine-adduct was neutralized and dispersed in water as follows. To 1150 grams of the glycidol-modified adduct was added 14.9 grams of lactic acid to effect 20 percent total neutralization. The neutralized adduct was dispersed in stages in water to produce an aqueous dispersion having about 30 percent solids content. The resultant dispersion was solvent-stripped by azeotropic distillation. Thereafter, additional lactic acid was added to the dispersion to raise the total neutralization to 45 percent.

EXAMPLE 1F

A glycidol-modified adduct of the invention was prepared as follows:

| Ingredients | Parts by Weight (grams) | Equivalents |
| --- | --- | --- |
| The Jeffamine-adduct of Example 1B | 1300 | 1.063 |
| Glycidol | 78.7 | 1.063 |

The Jeffamine-adduct was charged to a properly equipped reaction vessel and heated to 100° C. followed by the addition of glycidol. The resultant mixture was held thereat for about five hours with attainment of an epoxy equivalent weight of infinity.

The resulting glycidol-modified Jeffamine-adduct was neutralized and dispersed in water as follows. To 1150 grams of the glycidol-modified adduct was added 14.9 grams of lactic acid to effect 20 percent total neutralization. The neutralized adduct was dispersed in water, in stages, to produce an aqueous dispersion having about 30 percent solids content. The resultant dispersion was solvent-stripped by azeotropic distillation. Thereafter, 18.1 grams of lactic acid was added to raise to 45 percent the total neutralization of the dispersion.

EXAMPLE 1G

A glycidol-modified adduct of the invention was prepared as follows:

| Ingredients | Parts by Weight (grams) | Equivalents |
| --- | --- | --- |
| The Jeffamine-adduct of Example 1B | 1300 | 1.063 |
| Glycidol | 118 | 1.5945 |

| Ingredients | Parts by Weight (grams) | Equivalents |
|---|---|---|
| Benzyldimethylamine | 1.28 | |

The Jeffamine-adduct was charged to a properly equipped reaction vessel and heated to 100° C. followed by the addition of glycidol. The resultant mixture was held thereat for about three hours when the benzyldimethylamine was added. The resultant mixture was held at 100° C. for about five hours until the epoxy equivalent weight of infinity was attained.

The resulting glycidol-modified Jeffamine-adduct was neutralized and dispersed in water as follows. To 1150 grams of the glycidol-modified adduct was added 14.0 grams of lactic acid to effect 20 percent total neutralization. The neutralized adduct was dispersed in water, in stages, to produce an aqueous dispersion having about 30 percent solids content. The resultant dispersion was then solvent-stripped by azeotropic distillation. Thereafter, 17.6 grams of lactic acid was added to raise to 45 percent the total neutralization of the aqueous dispersion.

EXAMPLES OF COATING COMPOSITIONS

In the following examples, cationic electrodepositable coating compositions were formulated with the glycidol-modified epoxy-amine adducts described herein, a cationic resin, a pigment paste, and other coating additives which are as follows:

EXAMPLE 2

The cationic resin, useful herein, was prepared from the following mixture of ingredients:

| Ingredients | Parts by Weight (grams) |
|---|---|
| EPON 828[1] | 524.0 |
| Bisphenol A-ethylene oxide adduct (1/6 molar ratio) | 189.0 |
| Xylene | 46.0 |
| Bisphenol A | 152.0 |
| Benzyldimethylamine (catalyst) | 0.39 |
| Benzyldimethylamine | 0.97 |
| Crosslinker[2] | 694 |
| Diketimine[3] | 59.0 |
| N—methylethanolamine | 50 |
| DOWANOL PPH[4] | 72 |
| 88% Aqueous lactic acid | 47.5 |
| Surfactant[5] | 23 |
| Deionized water | 2457 |

[1]Epoxy resin solution made from reacting epichlorohydrin and bisphenol A having an epoxy equivalent of about 188, commercially available from Shell Chemical Company.
[2]The crosslinker which was formed from half-capping toluene diisocyanate (80/20 2,4-/2,6-isomer mixture) with 2-hexoxyethanol and reacting this product with trimethylolpropane in a 3:1 molar ratio. The crosslinker was present as a 70 percent solids solution in methyl isobutyl ketone butanol (9:1 weight ratio).
[3]Diketimine derived from diethylenetriamine and methyl isobutyl ketone (73% solids in methyl isobutyl ketone).
[4]1-Phenoxy-2-propanol from Dow Chemical Co.
[5]Cationic surfactant prepared by blending 120 parts of alkyl imidazoline commercially available from Geigy Industrial Chemicals as GEIGY AMINE C, 120 parts by weight of an acetylenic alcohol commercially available from Air Products and Chemicals Inc. as SURFYNOL 104, 120 parts by weight of 2-butoxyethanol and 221 parts by weight of deionized water and 19 parts of glacial acetic acid.

The EPON 828, bisphenol A-ethylene oxide adduct, bisphenol A, and methyl isobutyl ketone were charged to a reaction vessel and heated together under a nitrogen atmosphere to 140° C. The first portion of benzyldimethylamine was added and the reaction mixture allowed to exotherm to 183° C. and refluxed under reduced pressure to remove azeotropically any water present. The reaction mixture was cooled to 160° C., held for one-half hour, cooled further to 145° C., and the second portion of benzyldimethylamine were added. The reaction mixture was held at 145° C. for two hours at which time a reduced Gardner-Holdt viscosity (50 percent resin solids in 2-methoxypropanol) of Q-R was obtained. The polyurethane crosslinker, diketimine derivative, and N-methylethanolamine were added and the temperature of the reaction mixture brought to 118° C. and held at this temperature for 1.5 hours. The DOWANOL PPH was added and the reaction mixture was dispersed in a mixture of the lactic acid, surfactant, and deionized water. Further portions of water were gradually added to bring the resin solids to 33 percent. Stripping in vacuum to remove organic solvent gave a dispersion having a solids content of 38.9 percent. The crosslinker comprised about 35 percent of the resin solids.

EXAMPLE 3

A pigment paste, useful herein, was prepared with a pigment grinding vehicle and a catalyst paste which are described hereinbelow:

| | Quaternizing Agent | |
|---|---|---|
| Ingredients | Parts by Weight (grams) | Solids |
| 2-Ethylhexanol half-capped toluene diisocyanate in methyl isobutyl ketone | 320 | 304 |
| Dimethylethanolamine | 87.2 | 87.2 |
| Aqueous lactic acid solution | 117.6 | 88.2 |
| 2-Butoxyethanol | 39.2 | |

The 2-ethylhexanol half-capped toluene diisocyanate was added to the dimethylethanolamine in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quarternizing agent.

PIGMENT GRINDING VEHICLE

A pigment grinding vehicle was prepared from the following charge:

| Ingredients | Parts by Weight (grams) | Solids |
|---|---|---|
| EPON 829 | 710 | 682 |
| Bisphenol A | 289.60 | 289.6 |
| 2-Ethylhexanol monourethane of 2,4-toluene diisocyanate in methyl isobutyl ketone | 406 | 386.10 |
| Quaternizing agent as described above | 496.3 | 421.9 |
| Deionized water | 71.2 | |
| 2-Butoxyethanol | 1490 | |

The EPON 829 and bisphenol A were charged under a nitrogen atmosphere to a suitable reaction vessel and heated to 150 to 160° C. to initiate an exotherm. The reaction mixture was permitted to exotherm for one hour at 150 to 160° C. The reaction mixture was then cooled to 120° C. and the 2-ethylhexanol half-capped toluene diisocyanate added. The temperature of the reaction mixture was held at 110 to 120° C. for one hour followed by the addition of the 2-butoxyethanol. The reaction mixture was then cooled to 85 to 90° C., homogenized and then charged with water followed by the addition of the quaternizing agent. The temperature of the reaction mixture was held at 80 to 85° C. until an acid value of about 1 was obtained.

CATALYST PASTE

A dibutyltinoxide catalyst paste was prepared as follows:

| Ingredients | Parts by Weight (grams) |
| --- | --- |
| Pigment grinding vehicle as described above | 145 |
| Dibutyltinoxide | 200 |
| Deionized water | 321.6 |

The above ingredients were ground in a mill to a Hegman No. 7 grind.

PIGMENT PASTE

A pigment paste was prepared from the following mixture of ingredients:

| Ingredients | Parts by Weight (grams) |
| --- | --- |
| Titanium dioxide | 564.31 |
| Lead silicate | 33.08 |
| Carbon black | 16.54 |
| Pigment grinding vehicle as described above | 226.36 |
| Deionized water | 388.90 |
| Catalyst paste as described above | 87.38 |

The above ingredients were ground in a mill to a Hegman No. 7

CATIONIC ELECTRODEPOSITABLE COATING COMPOSITIONS

The following examples are of cationic electrodepositable coating compositions containing the glycidol-modified adducts of the invention to enhance surface appearance without adversely affecting adhesion.

For the purpose of comparison, compositions with an additive of the prior art (U.S. Pat. No. 4,432,850) and for the purposes of control, compositions with no additive were formulated as follows:

EXAMPLE 4 (CONTROL)

As a control, a cationic electrodeposition bath with no crater-control additive was prepared by blending the following mixture of ingredients:

| Ingredients | Parts by Weight (grams) | Pigment Solids | Resin Solids |
| --- | --- | --- | --- |
| Cationic electrodeposition resin of Example 2 | 1504.3 | — | 565.5 |
| PARAPLEX WP-1[1] | 36.1 | — | 36.1 |
| Pigment Paste of Example 3 | 390.5 | — | 41.4 |
| Deionized water | 1869.1 | — | — |

[1]Available from Rohm and Haas Co.

After 40 percent ultrafiltration, the bath had a pH of 6.6 and a resistivity at 20° C. of 1400 micromhos per centimeter.

EXAMPLE 5 (COMPARATIVE)

As a comparative example, a cationic electrodeposition bath with the unmodified adduct of Example 1C (additive of U.S. Pat. No. 4,432,850) was prepared by blending the following mixture of ingredients:

| Ingredients | Parts by Weight (grams) |
| --- | --- |
| Cationic electrodeposition resin of Example 2 | 1367.5 |
| Reaction product of Example 1C | 178.1 |
| PARAPLEX WP-1 | 36.1 |
| Deionized water | 1827.8 |
| Pigment Paste of Example 3 | 390.5 |

After 40 percent ultrafiltration, the bath had a pH of 6.24 and an electroconductivity of 1400 micromhos per centimeter at 77° F., percent solids of 22, and a pigment to binder ratio of 0.3:1.

EXAMPLE 6

A cationic electrodeposition bath of this invention was prepared by blending the following ingredients:

| Ingredients | Parts by Weight (grams) |
| --- | --- |
| Cationic electrodeposition resin of Example 2 | 1367.5 |
| Glycidol-modified adduct of Example 1D | 177.5 |
| PARAPLEX WP-1 | 36.1 |
| Deionized water | 150.0 |
| Deionized water | 1678.4 |
| Pigment paste of Example 3 | 390.5 |

After 40 percent ultrafiltration, the bath had a pH of 6.26, solids of 22 percent, conductivity (at 25° C.) of 1400 micromhos per centimeter at 77° F. and a pigment to binder ratio of 0.3:1

EXAMPLE 7

A cationic electrodeposition bath of this invention was prepared by blending the following ingredients:

| Ingredients | Parts by Weight (grams) |
| --- | --- |
| Cationic electrodeposition resin of Example 2 | 1367.5 |
| Glycidol-modified adduct of Example 1E | 179.9 |
| PARAPLEX WP-1 | 36.1 |
| Deionized water | 150.0 |
| Deionized water | 1676.0 |
| Pigment paste of Example 3 | 390.5 |

After 40 percent ultrafiltration, the bath had a pH of 6.24, solids of 22 percent, conductivity of 1375 micromhos per centimeter at 70° F. and a pigment to binder ratio of 0.3:1.

Example 8

A cationic electrodeposition bath of this invention was prepared by blending the following ingredients:

| Ingredients | Parts by Weight (grams) |
| --- | --- |
| Cationic electrodeposition resin of Example 2 | 1367.5 |
| Glycidol-modified adduct of Example 1F | 177.5 |

-continued

| Ingredients | Parts by Weight (grams) |
|---|---|
| PARAPLEX WP-1 | 36.1 |
| Deionized water | 150.0 |
| Deionized water | 1678.4 |
| Pigment paste of Example 3 | 390.5 |

After 40 percent ultrafiltration, the bath had a pH of 6.19, solids of 22 percent, conductivity of 1400 micromhos per centimeter, at 77° F. and a pigment to binder ratio of 0.3:1.

EXAMPLE 9

A cationic electrodeposition bath of this invention was prepared by blending the following ingredients:

| Ingredients | Parts by Weight (grams) |
|---|---|
| Cationic electrodeposition resin of Example 2 | 1367.5 |
| Glycidol-modified adduct of Example 1G | 177.5 |
| PARAPLEX WP-1 | 36.1 |
| Deionized water | 150.0 |
| Deionized water | 1678.4 |
| Pigment paste of example 3 | 390.5 |

After 40 percent ultrafiltration, the bath had a pH of 6.19, solids of 22 percent, conductivity of 1425 micromhos per centimeter at 77° F. and a pigment to binder ratio of 0.3:1.

Evaluation:

The electrodepositable compositions were employed as primers by cathodically electrocoating the same on zinc phosphate pretreated steel panels. The electrocoated panels were baked in an electric oven at 340° F. for 30 minutes. The electrocoats were the topcoated with alkyds compositions (available as polar white and leaf green alkyds from PPG Industries, Inc.). The cured coatings were evaluated for surface appearance, topcoat adhesion which are defined as follows and reported in the table hereinbelow.

Another set of panels was deliberately contaminated with oil before electrocoating and curing as above. Surface appearance for craters was visually determined with a rating on a scale of 0 to 10, with 10 being very good and 0 being very poor.

Topcoat adhesion was measured by gravelometer testing (ASTM D-3170) with a rating of 0 to 10. A rating of 10 was very good and a rating of 0 was very poor.

TABLE 1

| Electrocoat of: | White Alkyd Topcoat | | Green Alkyd Topcoat | | Visual Appearance for Craters of Oil Contaminated Panels | |
|---|---|---|---|---|---|---|
| | DOI | Adhesion | DOI | Adhesion | (1 mil) | (1.5 mil) |
| Example 4 (Control) | 87.8 | 2-3 | 94.0 | 3 | 1 | 0 |
| Comparative Example 5 | 90.4 | 3 | 94.2 | 2-3 | 5 | 2 |
| Example 6 | 90.1 | 3 | 94.6 | 3 | 5.5 | 3 |
| Example 7 | 89.3 | 5 | 92.8 | 4 | 6 | 3.5 |
| Example 8 | 89.8 | 6 | 93.0 | 5-6 | 6.5 | 4 |
| Example 9 | 89.9 | 6 | 94.1 | 6 | 7 | 5 |

As can be seen from the foregoing, glycidol modification substantially improves topcoat adhesion while slightly improving surface appearance.

What is claimed is:

1. A resinous composition comprising a glycidol-modified ungelled resin comprising a reaction product of (i) an amine-functional polyepoxide-polyoxyalkylenepolyamine adduct, and (ii) glycidol.

2. The resinous composition of claim 1 wherein the adduct is prepared by reacting:
   (a) a polyepoxide and
   (b) a polyoxyalkylenepolyamine; the ratio of equivalents of active hydrogens in (b), with primary amine groups being considered monofunctional, to equivalents of epoxy in (a) being within the range of 1.05 to 2:1.

3. The resinous composition of claim 1 wherein the polyepoxide is a polyglycidyl ether of a cyclic polyol.

4. The resinous composition of claim 3 wherein the cyclic polyol is a diol.

5. The resinous composition of claim 4 wherein the polyglycidyl ether of the cyclic diol is a polyglycidyl ether of bisphenol A or hydrogenated bisphenol A having a molecular weight within the range of 340 to 2,000.

6. The resinous composition of claim 1 in which the polyoxyalkylenepolyamine is a polyoxypropylenepolyamine.

7. The resinous composition of claim 6 in which the polyoxypropylenepolyamine is a diamine.

8. The resinous composition of claim 1 in which the polyoxyalkylenepolyamine has a molecular weight within the range of about 137 to 3,600.

9. The resinous composition of claim 8 in which the polyoxyalkylenepolyamine has an amine equivalent weight of about 69 to1800.

10. The resinous composition of claim 1 wherein the glycidol is reacted with polyepoxide-polyoxyalkylenepolyamine adduct in a ratio of 0.2 to 3 per equivalent of amine.

11. The resinous composition of claim 1 which is at least partially neutralized with acid to provide cationic groups, and dispersed in the aqueous medium.

12. A glycidol-modified polyepoxide-polyalkylenepolyamine adduct of claim 1 wherein the polyepoxide-polyalkylenepolyamine adduct is formed from reacting:
   (a) a polyglycidyl ether of a cyclic polyol having a molecular weight of about 340 to 5,000 and an epoxy equivalent of 170 to 3,000.
   (b) a polyoxyalkylenediamine having a molecular weight of about 400 to 3,000; the ratio of equivalents of active hydrogens in (b), with primary amine groups being considered monofunctional, to equivalents of epoxy in (a) being within the range of about 1.05 to 2:1.

13. A glycidol-modified polyepoxide-polyalkylenepolyamine adduct of claim 12 in which the polyglycidyl ether of a cyclic polyol has a molecular weight of 340 to 2,000 and an epoxy equivalent of 170 to 1,000.

14. A glycidol-modified polyepoxide-polyalkylenepolyamine adduct of of claim 13 in which the polyoxyalkylenediamine has a molecular weight of 800 to 2,500.

15. A glycidol-modified polyepoxide-polyalkylenepolyamine adduct of claim 12 in which the polyoxyalkylenediamine is a polyoxypropylenediamine.

16. A coating composition containing the glycidol modified-polyoxyalklylenepolyamine adduct of claim 1.

17. An electrocoating composition containing the resinous composition of claim 11.

18. An improved process for preparing a multiple coated substrate comprising applying an electrocoat to the substrate and topcoating the electrocoated substrate, improvement comprising the electrocoating composition as recited in claim 17.

* * * * *